United States Patent [19]

Minakuchi

[11] 4,177,412

[45] Dec. 4, 1979

[54] CLOSED LOOP ROTATIONAL SPEED CONTROL SYSTEM HAVING MEANS FOR GENERATING A PNM SIGNAL FOR AN ELECTRIC MOTOR

[75] Inventor: Hiroshi Minakuchi, Kadoma, Japan

[73] Assignee: Matsushita Electric Industrial Co., Ltd., Japan

[21] Appl. No.: 860,440

[22] Filed: Dec. 14, 1977

[30] Foreign Application Priority Data

Dec. 15, 1976 [JP] Japan .................. 51/151118

[51] Int. Cl.$^2$ .................................. H02P 5/06
[52] U.S. Cl. .......................... 318/341; 318/331
[58] Field of Search ........... 318/341, 331, 310, 315, 318/317, 327

[56] References Cited

U.S. PATENT DOCUMENTS

| | | | |
|---|---|---|---|
| 3,504,260 | 3/1970 | Staples | 318/341 |
| 3,803,470 | 4/1974 | Vosteen | 318/331 |
| 4,011,491 | 3/1977 | Grover et al. | 318/341 |

*Primary Examiner*—Gene Z. Rubinson
*Assistant Examiner*—M. K. Mutter
*Attorney, Agent, or Firm*—Lowe, King, Price & Becker

[57] ABSTRACT

A PNM (pulse number modulation) signal is generated in response to a DC signal the magnitude of which is in proportion to the detected rotational speed of an electric motor to regulate a period of time for which an electric power is fed to the motor by switching the electric power in accordance with the PNM signal. The switching frequency is arranged to vary depending on the variation of the load of the motor.

6 Claims, 6 Drawing Figures

CLOSED LOOP ROTATIONAL SPEED CONTROL SYSTEM HAVING MEANS FOR GENERATING A PNM SIGNAL FOR AN ELECTRIC MOTOR

FIELD OF THE INVENTION

The present invention generally relates to a rotational speed control system for an electric motor, and more specifically to a switching regulator for same.

BACKGROUND OF THE INVENTION

As a conventional type of a rotational speed control system for an electric motor which is referred to as a motor hereinafter, a time sharing servo system has been proposed and is well known. The time sharing servo system employs a switching regulator in which a counter electromotive force is detected for producing a rotational speed control signal while electric power is not supplied to a motor. The above-mentioned method of rotational speed control is proposed by a U.S. Pat. No. 3,624,474.

According to the above-mentioned method, a train of rectangle pulse signals is produced by an astable multivibrator where the signal train has a given repetative frequency and a duty-cycle. The motor of the system is fed with an electric power while the output of the astable multivibrator is high (H) or low (L). The counter electromotive force produced by the motor is detected during one of above-mentioned periods for which the electric power is not supplied and the rate of supplying the electric power to the motor is regulated in accordance with the magnitude of the detected counter electromotive force.

This means that the motor is supplied with the electric power fully in the feeding period when the rotational speed of the motor is below a predetermined rotational speed while the motor is supplied with the electric power with a lower supplying rate than before when the rotational speed of same is over the predetermined rotational speed.

The above-mentioned method is called a time sharing servo method which utilizes a PWM (pulse with modulation) signal since electric power is fed to the motor upon presence of a pulse where the pulse width varies in accordance with the variation of the load of the motor. The periods of feed and non-feed of the electric power are almost equal to each other. The time sharing servo method utilizing a PWM signal described hereinabove, however, includes some disadvantages which will be described hereinbelow.

The ratio of a period for which the electric power may be fed to the motor to the other period for which the electric power is not fed to the same is determined by the duty cycle of the train of pulses produced by the astable multivibrator. Therefore the ratio of same is constant. Assuming the ratio is 3, that is the period for which the electric power may be fed to the motor is 3 and the period for which the electric power is not fed to same is 1, the maximum feeding ratio can not be arranged over 3 to 1 even though the rotational speed of the rotor of the motor is below a predetermined value. Therefore the electric power fed from the power supply is utilized by the motor to an extent of three fourths maximum causing a fact that one fourth of same is not utilized at all.

In the time sharing servo method the non-feed period is utilized for detecting the counter electromotive force and this period of time for detecting the counter electromotive force can not be made so short that the counter electromotive force may be influenced by spike pulses produced by the motor immediately after the electric power is cut after each feed period. The peak value of the above-mentioned spike pulse depends on a differentiation of the current through the armature of the motor in time as well as the inductance of the armature. Therefore, the counter electromotive force can not be detected during a period of time for which the spike pulse maintains.

As an example, the inductance of small DC motor utilized for a cassette tape recorder is approximately 10 to 20 mH and a spike pulse produced by same lasts approximately 0.5 to 1.0 msec. If the period of time for which the spike pulse lasts is over 1 msec, the counter electromotive force can not be detected when the period of time for detecting same is arranged less than 1 msec. Therefore the detecting period should be approximately 10 msec in order to provide an accurate control.

Turning back to the before-mentioned ratio of the feed and non-feed of the electric power, where the ratio is 3 to 1, a period of time of one cycle of feed and non-feed is 40 msec and thus the motor is regulated by a PWM switching signal of 25 Hz. When it is aimed to raise the efficiency of the feed of the electric power, the above-mentioned ratio may be arranged as 9 to 1 so that 90% of the electric power is utilized by the motor. With this arrangement, however, the switching frequency becomes 10 Hz with which the electric power is fed to the motor only once in three rotations of the rotor of the motor when the rotor is arranged to rotate at 1,800 rpm. In this manner of feed of electric power, vibration of the motor is apt to increase and further the accuracy of the control is also apt to deteriorated.

As described above according to the conventional time sharing servo method, it is required to lengthen the feed period in order to increase the efficiency of the feed of the electric power where the long period of feed compared to that of non-feed causes a decrease of the switching frequency since the minimum detecting time for detecting the counter electromotive force is limited depending of the characteristic of the motor.

SUMMARY OF THE INVENTION

The present invention has been developed to overcome the abpve-mentioned drawbacks of the conventional type of rotational speed control systems. In the present invention, a PNM (pulse number modulation) signal is obtained in response to a DC signal the magnitude of which varies in accordance with the rotational speed of the rotor of a motor. The number of pulses of the PNM signal per a unit time is arranged to increase depending on the increase of the DC voltage. The period of electric supply to the motor is regulated by the PNM signal.

Therefore it is a primary object of the present invention to provide an improved rotational speed control system in which the electric power of the power supply is effectively used.

Another object of the present invention is to provide such a system in which the switching frequency is higher than conventional type of speed control system.

A further object of the present invention is provide such a system in which the vibration of the motor is considerably reduced compared to that of conventional type.

A further object of the present invention is to provide such a system in which the rotational speed of the rotor of the motor is controlled accurately.

A further object of the present invention is to provide such a system in which a predetermined rational speed of the motor can be selected in a wide range.

A still further object of the present invention is to provide such a system in which the switching frequency varies in accordance with the magnitude of the load of the motor.

BRIEF DESCRIPTION OF THE DRAWINGS

The invention will become more readily apparent from the following detailed description taken in conjunction with the accompanying drawings in which.

DETAILED DESCRIPTION OF THE PREFERRED EMBODIMENTS

Figure 1:
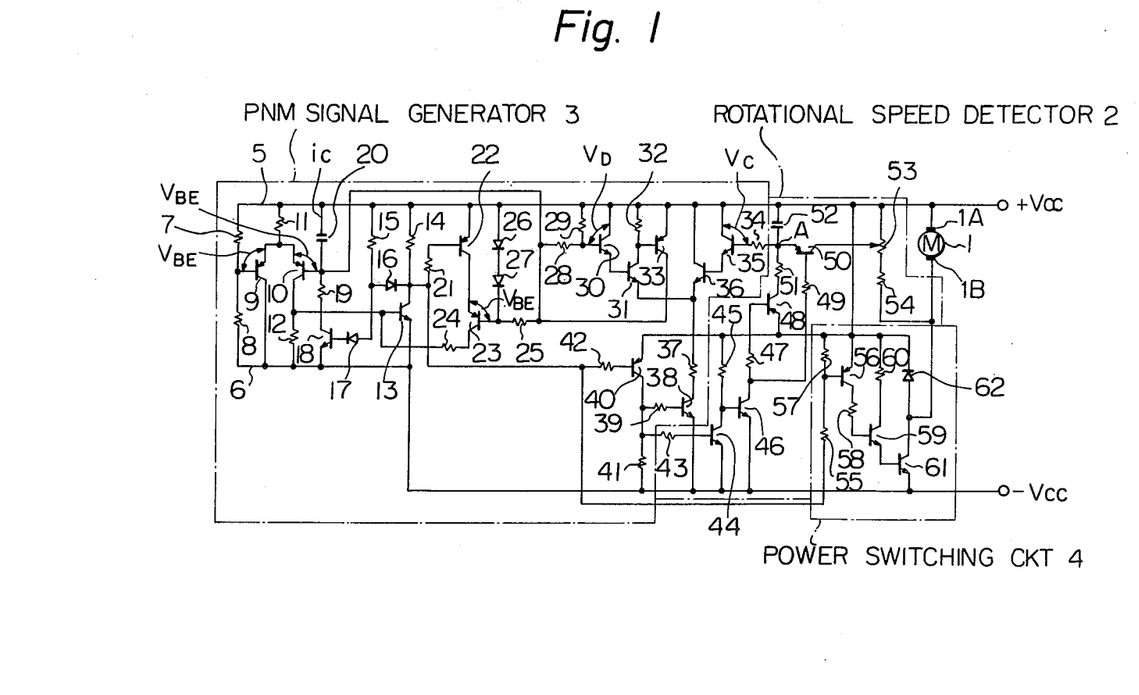
FIG. 1 shows a first preferred embodiment of the rotational speed control system according to the present invention.

Reference is now made to FIG. 1 which shows a first preferred embodiment of the rotational speed control system according to the present invention. The rotational speed control system shown in FIG. 1 includes a rotational speed detector 2, a PNM (pulse number modulation) signal generator 3 and a power switching circuit 4. The rotational speed detector 2 is connected to a DC motor 1 to produce a DC voltage the magnitude of which varies in accordance with the rotational speed of the rotor of the DC motor 1. The PNM signal generator 3 is connected to the rotational speed detector 2 to generates a PNM signal in which the number of the pulses of the PNM signal per a unit time varies in accordance with the magnitude of the DC voltage produced by the rotational speed detctro 2. The power switching circuit 4 is connected to the PNM signal generator 3 and further to the DC motor 1 to regulate the energization of the DC motor 1 in accordance with the output signal of the PNM signal generator 3. The construction and the function of the circuitry shown in FIG. 1 including above-mentioned three circuits 2, 3 and 4 will be described hereinbelow in details.

A positive bus line 5 and a negative bus line 6 are supplied with positive power source $+V_{CC}$ and a negative power source $-V_{CC}$. A pair of resistors [R]7 and [R]8 constituting a voltage divider are connected in series at their one ends by a junction while the other end of the resistor [R]7 is connected to the positive bus line 5 and the other end of the resistor [R]8 is connected to the negative bus line 6. The junction is connected to a base of a transistor 9 while the collector of the transistor 9 is connected to the negative bus line 6. The emitter of the transistor 9 is connected to an emitter of a transistor 10 and further connected via a resistor 11 to the positive bus line. The collector of the transistor 10 is connected via a resistor 12 to the negative bus line 6 while the collector of same is connected to a base of a transistor 13. The emitter of the transistor 13 is connected to the negative bus line 6 while the collector of same is connected via a resistor 14 to the positive bus line 5. One terminal of a resistor 15 is connected to the positive bus line 5 where the other terminal of same is connected to an anode of a diode 16. The cathode of the diode 16 is connected to the collector of the transistor 13.

The anode of the diode 16 is connected to an anode of a diode 17 while the cathode of the diode 17 is connected to a base of a transistor 18. The emitter of the transistor 18 is connected to the negative bus line 6 while the collector of same is connected via a resistor 19 to the base of the transistor 10. A capacitor 20 is interposed between the positive bus line 5 and the base of the transistor 10.

The collector of the transistor 13 is further connected via a resistor 21 to a base of transistor 22 while the emitter of the transistor 22 is connected to the positive bus line 5. The collector of the transistor 22 is connected to an emitter of a transistor 23. The collector of the transistor 23 is connected via a resistor 24 to the base of the transistor 13 while the base of the transistor 23 is connected via a resistor 25 to the base of the transistor 10. A pair of diodes 26, 27 are connected in series and interposed between the positive bus line 5 and the base of the transistor 23.

Above-mentioned construction constructed by elements from the resistor 7 to the diodes 26 and 27 forms a pulse generator (no numeral) in the PNM signal generator 3. Other elements which will described hereinbelow form a comparing-inverting circuit in the PNM signal generator 3.

A pair of resistors 28 and 29 are connected in series forming a voltage divider where one end of the resistor 28 is connected to the base of the transistor 10 while one end of the other resistor 29 is connected to the positive bus line 5. The junction of the resistors 28 and 29 is connected to a base of a transistor 30. The collector of the transistor 30 is connected to the positive bus line 5 while the emitter of same is connected to a base of a transistor 31. The collector of the transistor 31 is connected to a base of a transistor 33 and further connected via a resistor 32 to the positive bus line 5 while the emitter of the transistor 31 is connected to an emitter of a transistor 36 and further connected via a resistor 37 to a collector of a transistor 38. The emitter of the transistor 33 is connected to the positive bus line 5 while the collector of same is connected to the base of the transistor 10.

An output terminal of the rotational speed detector 2 is denoted by "A". A base of a transistor 35 is connected via a resistor 34 to the output terminal A. The collector of the transistor 35 is connected to the bus line 5 while the emitter of same is connected to the base of the transistor 36. Meanwhile the collector of the previously mentioned transistor 36 is connected to the bus line 5. The emitter of the transistor 38 is connected to the negative bus line 6 while the base of same is connected via a resistor 39 to a collector of a transistor 40. The emitter of the transistor 40 is connected to the positive bus line 5 while the collector of same is connected via a resistor 41 to the negative bus line 6. The base of the transistor 40 is connected via a resistor 42 to the collector of the transistor 13.

It is to be noted that above-mentioned transistors 30, 31, 33, 35, 36, 38 and 40 including some resistors connected thereto form the before-mentioned comparing-inverting circuit. Hereinbelow the construction of the rotational speed detector 2 is made.

The collector of the transistor 40 included in the comparing-inverting circuit of the PNM signal generator 3 is connected through a resistor 43 to a base of a transistor 44. The emitter of the transistor 44 is connected to the negative bus line 6 while the collector of same is connected to a base of transistor 46 and further connected via a resistor 45 to the positive bus line 5. The emitter of the transistor 46 is connected to the negative bus line 6 while the collector of same is connected via a resistor 47 to a base of a transistor 48 and is further connected via a resistor 49 to a base of a transistor 50. The emitter of the transistor 48 is connected to the positive bus line 5 while the collector of same is connected via a resistor 51 to the output terminal A. A capacitor 52 is interposed between the positive bus line 5 and the output terminal A.

One terminal 1A of the DC motor 1 is connected to the positive bus line 5. A variable resistor 53, one terminal of which is connected to the positive bus line 5, is connected in series with a resistor 54. The other terminal of the resistor 54 is connected to a terminal 1B of the motor 1. A terminal connected to a movable armature of the variable resistor 53 is connected to a collector of the transistor 50 while the emitter of the transistor 50 is connected to the output terminal A.

The above-mentioned rotational speed detector 2 is formed by three circuits, i.e. a smoothing circuit, a sampling circuit and a voltage dividing circuit for setting a predetermined rotational speed. The smoothing circuit is constructed by the capacitor 52. The sampling circuit is constructed by four transistors 44, 46, 48 and 50 as well as resistors connected thereto where while the transistor 48 is utilized as a second switching transistor. The voltage dividing circuit is constructed by the variable resistor 53 and the resistor 54 connected to the variable resistor 53 in series.

The construction of the power switching circuit 4 will be made hereinafter. The collector of the transistor 13 included in the PNM signal generator 3 is connected via a resistor 55 to a base of a transistor 56. A resistor 57 is interposed between the positive bus line 5 and the base of the transistor 56. The emitter of the transistor 56 is connected to the positive bus line 5 while the collector of same is connected via a resistor 58 to a base of a transistor 59. The collector of the transistor 59 is connected via a resistor 60 to the positive bus line 5 while the emitter of same in connected to a base of a transistor 61. The collector of the transistor 61 is connected to the terminal 1B of the DC motor 1 and is further connected to an anode of a diode 62. The cathode of the diode 62 is connected to the positive bus line 5 while the emitter of the transistor 61 is connected to the negative bus line 6 so that the diode 62 is reversely biased.

Now the function and the operation of the circuitry shown in FIG. 1 is made hereinbelow. When a DC voltage is applied across the terminals $+V_{CC}$ and $-V_{CC}$, only two transistors 9 and 18 become conductive among transistors included in the pulse generator of the PNM signal generator 3. Other transistors 10, 13, 22 and 23 are off.

Since the transistor 18 is on, the capacitor 20 is gradually charged with an electric current flowing therethrough and the resistor 19 as well as the transistor 18.

Therefore the voltage at the base of the transistor 10 gradually lowers. When the voltage at the base of the transistor 10 becomes equal to that at the base of the transistor 9 which is slightly above the voltage of the negative bus line 6, the transistor 10 becomes conductive. Some of the collector current of the transistor 10 flows into the base of the transistor 13 so that the transistor 13 becomes on to assume a saturation state in response to the base current thereof.

At this instant, the diode 16 becomes conductive and the voltage at the anode of the diode 16 lowers. Therefore, no base current is applied to the base of the transistor 18 any more and thus the transistor 18 becomes off. Since the transistor 18 is off, the capacitor 20 is not charged and the charge stored in the capacitor 20 starts to discharge instead.

When the transistor 13 assumes a saturation state some of the collector current thereof flows through the base of the transistor 22 and thus the transistor 22 turns saturated. Some of the collector current of the transistor 22 flows into the base of the transistor 23 so that the charge stored in the capacitor 20 is discharged through the resistor 25. Most of the collector current of the transistor 22 flows through the emitter and the collector of the transistor 23 and further through the resistor 24 and then flows into the base of the transistor 13.

As the result of this operation, since the charge of the capacitor 20 starts to discharge and the voltage of the base of the transistor 10 rises, the transistors 13, 22 and 23 maintain the saturated state as long as a residual charge which is enough to supply an adequate base current of the transistor 23 exists in the capacitor 20 even though the transistor 10 jumps to a off state immediately after the transistor becomes on.

As time advances, the residual charge in the capacitor 20 gradually decreases to an extent with which an adequate base current for the transistor 23 can not be supplied. At this instant, the transistor 23 turns to a cut-off state while the transistor 13 also becomes off because of the non-existance of the base current which has been supplied by the transistor 23.

As soon as the transistor 13 becomes off, the transistor 22 also becomes off and the transistor 18 becomes on again instead. With the above-mentioned operations one cycle of the operations is completed. When the transistor 18 jumps to an on state the capacitor 20 is again charged with a current flowing therethrough and the same operation mentioned above is repeated.

Figure 2A:
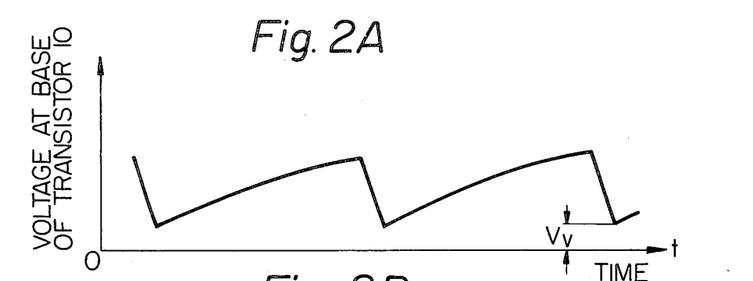
FIG. 2A is an explanatory graph of a voltage at the base of the transistor 10 shown in FIG. 1.
Figure 2B:
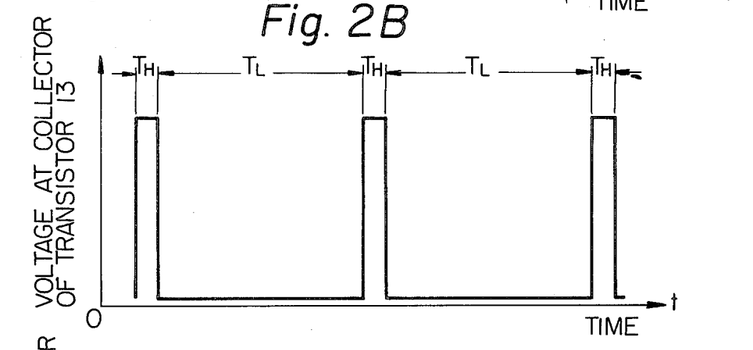
FIG. 2B is an explanatory graph of a voltage at the collector of the transistor 13 shown in FIG. 1.

FIG. 2A illustrates the voltage of the base of the transistor 10 while FIG. 2B illustrates the voltage of the collector of the transistor 13. The period of time denoted by $T_H$ in which the voltage at the collector of the transistor 13 is high and the period of time denoted by $T_L$ in which the same voltage is low are given by the following equations as well as the explanation thereof.

First of all following equation is given:

$$K \cdot R_{19} \cdot ic + (1/C_{20}) \int ic \, dt = K \cdot V_{CC} \qquad (1)$$

wherein $V_v$ is the lowest voltage of the sawtooth wave signal shown in FIG. 2A;

$R_{19}$ is a resistance of the resistor 19;

$C_{20}$ is a capacitance of the capacitor 20;

$V_{CC}$ is a voltage of the power source fed across the terminal $+V_{CC}$ and $-V_{CC}$;

ic is a charge current of the capacitor 20; and the voltage drop between the collectors and emitters of transistors 13 and 22 during the on states thereof is assumed to be zero while the base current of the transistor 30 is assumed to be so small that the base current can be ignored with respect to the current flowing through the reistor 28.

"K" shown in the equation (1) is defined by the following equation;

$$k = (R_{28} + R_{29})/(R_{19} + R_{28} + R_{29}) \tag{2}$$

wherein $R_{28}$ and $R_{29}$ are resistances of resistors 28 and 29.

Through a Laplace transformation of the equation (1) following equation is derived;

$$K \cdot R_{19} I_C(S) + \frac{1}{C_{20}} \left[ \frac{I_C(S)}{S} + \frac{q(0+)}{S} \right] = \frac{K \cdot V_{CC}}{S}; \tag{3}$$

The residual voltage of the capacitor 20 when the repetition of the operation as described hereinbefore, is same as the voltage $V_{BE}$ with which the residual voltage can not supply a base current to the transistor 23. Therefore as an initial condition the following equation is given wherein $V_{BE}$ is a forward voltage between bases and emitters of the transistors 9, 10 and 23;

$$q(0+)/C_{20} = V_{BE} \tag{4}$$

According to the above equation (4) the following equations (5) and (6) are derived;

$$I_C(S) = \frac{\frac{V_{CC}}{R_{19}} - \frac{V_{BE}}{K \cdot R_{19}}}{S + \frac{1}{K \cdot R_{19} \cdot C_{20}}} \cdot \tag{5}$$

$$i_c = L^{-1} I_C(S) = \left( \frac{V_{CC}}{R_{19}} - \frac{V_{BE}}{K \cdot R_{10}} \right) \epsilon^{-\frac{t}{K \cdot R_{19} \cdot C_{20}}} \tag{6}$$

According to the equation (6), the lowest voltage $V_v$ of the sawtooth wave signal at the base of the transistor 10 obtained by the capacitor 20 during a period of time denoted by $T_H$ is given by the following equation:

$$V_v = R_{19} \cdot [i_c]_t = T_H \tag{7}$$
$$= R_{19} \left( \frac{V_{CC}}{R_{19}} - \frac{V_{BE}}{K \cdot R_{19}} \right) \epsilon^{-\frac{T_H}{K \cdot R_{19} \cdot C_{20}}}$$
$$= (V_{CC} - \frac{V_{BE}}{K}) \epsilon^{-\frac{T_H}{K \cdot R_{19} \cdot C_{20}}}$$

On the other hand, the lowest voltage $V_v$ is restricted by the voltage at the base of the transistor 9 and thus following equation is derived;

$$V_v = (R_8)/(R_7 + R_8) V_{CC} \tag{8}$$

According to the equations (7) and (8) the following equation is given:

$$T_H = -K \cdot R_{19} \cdot C_{20} \ln \left\{ \frac{R_8}{(R_7 + R_8)(1 - \frac{V_{BE}}{K \cdot V_{CC}})} \right\} \tag{9}$$

Assuming the following parameters have relationship as $V_{BE} << V_{CC}$, $R_{19} << (R_{28} + R_{29})$, the following equation is derived:

$$T_H \approx -R_{19} \cdot C_{20} \cdot \ln(R_8/R_7 + R_8) \tag{10}$$

When the resistance of the resistor 25 is made considerably large than those of resistors 28 and 29, the charge stored in the capacitor 20 mainly discharges via the resistors 28 and 29 and thus following equation is derived.

$$T_L = -(R_{28} + R_{29})C_{20} \cdot \ln \left\{ \frac{(R_7 + R_8)V_{BE}}{R_7 \cdot V_{CC}} \right\} \tag{11}$$

When the voltage applied across the base and the collector of the transistor 35 is zero, a train of pulses $T_H$ and $T_L$ of which as shown in FIG. 2B are given by the equations (9) and (11), appears at the collector of transistor 13. When a constant DC voltage $V_C$ is applied across the base and the collector of the transistor 35, the transistors 40 and 38 are on while the charge of the capacitor 20 discharges where the period of time for which the charge of the capacitor 20 discharges is shown by $T_L$ in FIG. 2B.

Assuming a voltage $V_D$ between the base and the collector of the transistor 30 and when the voltage $V_D$ has a relationship such as $V_D > V_C$, the transistors 35 and 36 are conductive. However, when the voltage $V_D$ has a relationship such as $V_D < V_C$ the transistors 30 and 31 become conductive and then the transistor 33 turns conductive. Therefore the transistor 33 becomes conductive and thus the charge in the capacitor 20 immediately discharges when the transistors 23 and 13 become cutoff and thus the output of the transistor 13 inverts from a low level to a high level.

Assuming the voltage across the capacitor 20 as $V_e$ and the period of time for which the output of the transistor 13 inverts from the begining of the discharge as $T_C$ the following equations are given:

$$V_D = (R_{29})/(R_{28} + R_{29}) V_e \tag{12}$$

$$V_e = \frac{R_7}{R_7 + R_8} V_{CC} \cdot \epsilon^{-\frac{t}{(R_{28} + R_{29})C_{20}}} \tag{13}$$

Since the output inverts at the instant at which $V_D = V_C$, the following equation is obtained:

$$T_C = -(R_{28} + R_{29})C_{20} \cdot \ln \left\{ \frac{(R_7 + R_8)(R_{28} + R_{29})V_C}{R_7 \cdot R_{29} \cdot V_{CC}} \right\} \tag{14}$$

Under a condition given by the following equation $T_C = T_L$:

$$V_C < (R_{29} \cdot V_{BE})/(R_{28} + R_{29}) \tag{15}$$

According to the above-described equation (14), it will be understood that the period of time of low output of the transistor 13 can be varied at will by voltage $V_C$ applied across the base and the collector of the transistor 35. On the other hand the period of time $T_H$ is constant irrespectively of the voltage $V_C$ since the transistors 30, 31, 33, 35, 36, 38 and 40 are all cut-off while the output of the transistor 13 is high, i.e. during charging of the capacitor 20.

Consequently, an output signal, the pulse number of which is modulated by the voltage $V_C$ applied across the base and the collector of the transistor 35 which constitutes the input terminal of the PNM signal generator 3, appears at the collector of the transistor 13.

Figure 3A:
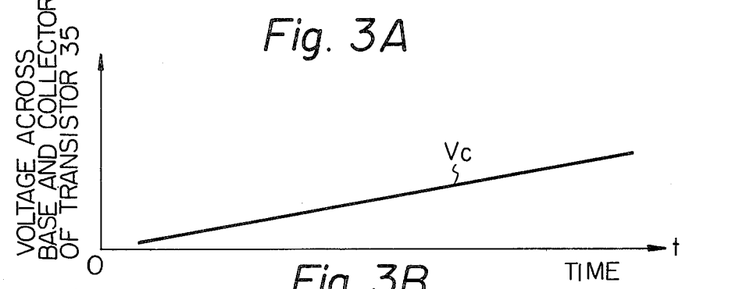
FIG. 3A is an explanatory graph of a voltage applied across the base and the collector of the transistor 35 shown in FIG. 1.
Figure 3B:
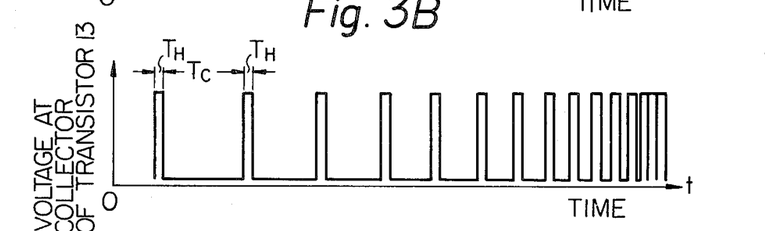
FIG. 3B is an explanatory graph of a voltage of the output signal of the PNM signal generator 3 shown in FIG. 1.

FIG. 3A and FIG. 3B illustrate the above described state where the period of time of low output signal of the PNM signal generator 3 shown in FIG. 3B gradually becomes shorter as the voltage $V_C$ shown in FIG. 3A increases as time advances. This means that the number of pulses of the PNM signal generator 3 per a unit time increases depending on the increase of the voltage $V_C$ across the base and the collector of the transistor 35.

Since the output signal at the collector of the transistor 13, i.e. the output signal of the PNM signal generator 3, is supplied via the resistor 55 to the base of the transistor 56, the DC motor 1 is fed with an electric current through the transistor 61 while the output signal is in the period of time of low output signal.

When the output signal becomes high, the transistors 56, 59 and 61 turn cut-off and also transistors 40 and 44 become cut-off. Therefore transistors 46, 48 and 50 turn conductive. Even though the transistor 61 turns cut-off since the DC motor maintains its rotation because of the inertia moment of the rotor thereof, a counter electromotive force, the magnitude of which is in proportion to the rotational speed of the rotor, apears across the terminals of the DC motor 1. Therefore a divided voltage of the counter electromotive force of the DC motor 1 divided by the resistors 53 and 54 is stored in the capacitor 52 during the time period of high output signal. After the output signal turns low the voltage of the charge stored in the capacitor 52 is compared with the voltage $V_D$ across the base and the collector of the transistor 30 and thus the period of time of low output signal is determined.

Summarizing the above described operations, a description hereinbelow will be made. As soon as the positive and negative bus lines 5 and 6 are supplied with the power supply, the voltage of the collector of the transistor 13 increases during the time period $T_H$ while the transistor 61 maintains its cut-off state. Even though the rotational speed detector 2 detects the counter electromotive force of the DC motor 1 the voltage across the both terminals of the capacitor 52 is zero since the rotor of the DC motor 1 is not rotating. Therefore, the transistor 33 is not conductive during the first period of time of the low output signal. The period of time of the low output signal lasts for a time $T_L$ while the transistor 61 feeds an electric current to the DC motor 1 by being conductive at the first period of time of the low output signal. After a time $T_L$ passes the transistor 61 again turns cut-off and thus the counter electromotive force of the DC motor 1 is detected. However, if the detected rotational speed of the rotor of the DC motor 1 is far from a predetermined rotational speed, the period of time of low output signal is arranged to last for a time $T_L$ again.

As described above, the period of time of low voltage of the output signal of the PNM signal generator 3 becomes equal or close to the time period $T_L$ until the rotational speed of the DC motor 1 reaches the predetermined rotational speed. Therefore, under an arrangement of the maximum period of time $T_L$ of the output signal of the low voltage being considerably longer than the period of time $T_H$ of the output signal of the high voltage, the period of time for which the transistor 61 is cut-off is considerably longer than that for which the transistor 61 is conductive. With this arrangement the rotor of the DC motor 1 is accelerated as almost same as that of a motor which is directly accelerated by the power supply without a switching regulator.

As the rotational speed of the rotor of the DC motor 1 increases and finally reaches the predetermined rotational speed, the rotational speed is maintained constant by the time period $T_C$ for which the output signal is low where the period of time $T_C$ equilibrates the magnitude of the load of the DC motor 1. Namely, when the rotational speed of the rotor is apt to decrease under increase of the load thereof, the period of time $T_C$ for which the output signal of the PNM signal generator 3 is low becomes longer causing the increase of the electric power fed to the DC motor 1 by the power switching circuit 4 including the transistor 61 and thus a drop of the rotational speed is prevented.

On the contrary, when the rotational speed of the rotor is apt to increase under decrease of the load, the period of time $T_C$ for which the output signal of the PNM signal generator 3 is low becomes shorter causing the decrease of the electric power fed to the DC motor 1 via the power switching circuit 4 and thus a rise of the rotational speed is prevented.

If the period of time $T_H$ for which the output signal of the PNM signal is high is selected as 10 msec while the maximum period of time $T_L$ for which the output signal of the PNM signal generator 3 is low is selected as 990 msec by selecting the constants of right sides of equations (10) and (11), the ratio of the periods of time for which the transistor 61 is conductive and cut-off, viz. the ratio of periods of time for which the DC motor 1 is fed with the electric power and is not fed with same is 99 to 1 at the starting time of the DC motor 1. This means that 99% of the electric power fed from the power supply can be effectively utilized in the DC motor 1.

After the rotational speed of the rotor of the DC motor 1 reaches the predetermined value, above-mentioned ratio of supply and non-supply of the electric power becomes approximately between 1 to 3 and 1 to 1 where the ratio varies in accordance with the magnitude of the load. Therefore the period of time of one cycle of the supply and non-supply is less than 20 msec and thus the switching frequency of the supply and non-supply is over 50 Hz.

Figure 4:
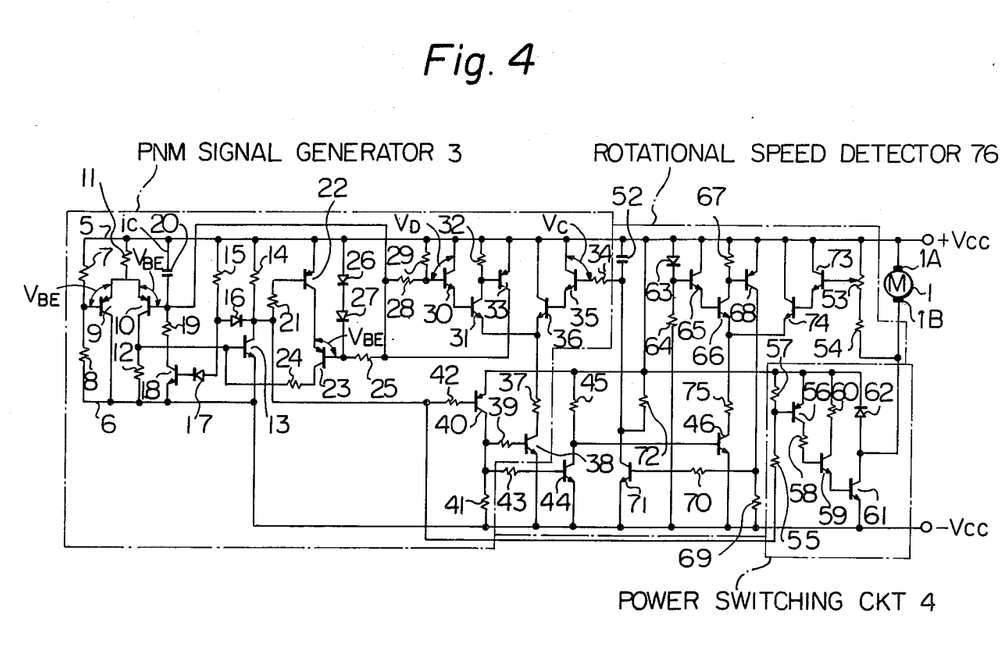
FIG. 4 shows a second preferred embodiment of the rotational speed control system according to the present invention.

Reference is now made to FIG. 4 which shows the second preferred embodiment of the rotational speed control system. The circuitry shown in FIG. 4 includes the DC motor 1, a rotational speed detector 76, the PNM signal generator 3 which has the same construction as in FIG. 1 and the power switching circuit 4 which also has the same construction as in FIG. 1. Therefore only the description of the rotational speed detector 76 will be made. Corresponding elements are designated by the same reference numerals as in FIG. 1.

An anode of a diode 63 is connected to the positive bus line 5 of the circuitry while the cathode of same is connected via a resistor 64 to the negative bus line 6. The cathode of the diode 63 is further connected to a base of a transistor 65. The collector of the transistor 65 is connected to the positive bus line 5 while the emitter of same is connected to a base of a transistor 66. The collector of the transistor 66 is connected to a base of a transistor 68 and is further connected via a resistor 67 to the positive bus line 5. The emitter of the transistor 68 is connected to the positive bus line 5 while the collector of same is connected via a resistor 69 to the negative bus line 6. The collector of the transistor 68 is further connected via a resistor 70 to a base of a transistor 71. The emitter of the transistor 71 is connected to the negative bus line 6 while the collector of same is connected via a resistor 72 to the positive bus line 5. A capacitor 52 is interposed between the positive bus line 5 and the collector of the transistor 71.

One terminal of a variable resistor 53 (a potentiometer) is connected to the positive bus line 5 while the one terminal 1A of the DC motor 1 is also connected to the positive bus line 5. The other terminal of the variable resistor 53 is connected to a terminal of a resistor 54 while the other terminal of the resistor 54 is connected to the other terminal 1B of the DC motor 1. The movable armature of the variable resistor 53 is connected to a base of a transistor 73. The collector of the transistor 73 is connected to the positive bus line 5 while the emitter of same is connected to a base of a transistor 74. The collector of the transistor 74 is connected to the positive bus line 5 while the emitter of same is connected to the emitter of the transistor 66. The emitter of the transistor 66 is further connected via a resistor 75 to a collector or of a transistor 46.

The emitter of the above-mentioned transistor 46 is connected to the negative bus line 6 while the base of same is connected to a collector of a transistor 44, the collector of which is connected via a resistor 45 to the positive bus line 5. The emitter of the transistor 44 is connected to the negative bus line 6 while the base of same is connected via a resistor 43 to the collector of the transistor 40 included in the PNM generator 3.

Above described elements form the rotational speed detector 76. Briefly describing the function of the circuitry shown in FIG. 4, two pairs of transistors 65, 66, and 73, 74 constitute a comparing circuit where a reference voltage produced by the diode 63 is applied to the base of the transistor 65 which forms one input terminal of the comparing circuit while the base of the transistor 73 forms the other input terminal of the comparing circuit. A switching circuit is constructed by the transistors 44 and 46 where the switching circuit is connected to the comprising circuit in series between the positive and negative bus lines 5 and 6. Further a sampling circuit is constructed by the comparing circuit and the switching circuit as well as the transistors 68 and 71.

The operations of the circuitry shown in FIG. 4 will be described hereinafter. When the output signal of the PNM signal generator 3 is low, the DC motor is fed with the electric power while the DC motor is not fed with same when the output of the PNM signal generator 3 is high. The period of time for which the output signal is high is a period of time for detecting the counter electromotive force of the DC motor. The detected counter electromotive force is divided by the voltage divider constructed by the variable resistor 53 and the resistor 54 connected in series thereto. The divided voltage obtained by the voltage divider is then compared with the reference signal, the magnitude of which is determined by the diode 63.

Namely, when the rotational speed of the rotor of the DC motor 1 increases under decrease of the load thereof, the transistors 68 and 71 become conductive and thus the capacitor 52 is charged during the period of time for the detecting the counter electromotive force. As the voltage across the capacitor 52 increases, the period of time for which the output signal of the PNM signal generator 3 is low, i.e. the period for feeding an electric power, shortens as shown in FIG. 3A and FIG. 3B. Therefore the rotational speed of the rotor of the DC motor 1 decreases since the electric power supplied thereto reduces.

On the contrary, in case of increase of the rotational speed of the rotor of the DC motor 1 under increase of the load thereof, the rotational speed is arranged to rise in the opposite manner.

Though the sampling circuit included in the rotational speed detector 76 shown in FIG. 4 is different from that shown in FIG. 1 in construction, the basic operation of the former is substantially same as that of the latter. The main difference of the rotational speed detector 76 from the other rotational speed detector 2 is that the former includes a comparing circuit where the counter electromotive force of the DC motor 1 is compared with a reference signal to produce an output signal of sampling. With this arrangement the former provides so high control gain that it may cause a hunting phenomenon depending on the object of the control.

According to the above-mentioned two embodiments shown in FIG. 1 and FIG. 4, the rotational speed control system is utilized for a DC motor with a brush assembly. However, the invention may be utilized for other type of DC motors and evern for AC motors when the motor has a suitable speed sensor such as a tachometer generator where the speed control system according to the present invention effectively controls the rotational speed of the rotor thereof.

Namely, since the main concept of the present invention is to regulate the rotational speed of an electric motor by switching the supply of an electric power by a PNM signal obtained from a DC signal the magnitude of which varies in accordance with the rotational speed of the motor, the pulse signal generator is provided not only for regulating the switching of the supply of the electric power but also controlling the operation of the PNM signal generator included in the control loop of the system by a feedback signal representative of the rotational speed. Therefore a very stable operation of the speed control system is provided.

Since the switching frequency varies in accordance with the magnitude of the load, the motor may be controlled by a low frequency of a switching signal because higher efficiency of supplying the electric power is required than a fast response under a heavy load while the motor may be controlled by a high frequency of the switching signal because faster response is required than the efficiency under a light load. Further, the input voltage of the rotational speed detectors 2 and 76 shown in FIG. 1 and FIG. 4 is divided by the variable resistor 53 where the variable resistor 53 is utilized for selecting the before-mentioned predetermined value of the rotational speed of the rotor of the DC motor 1. With this arrangement the voltage between the positive bus line 5 and the collector of the transistor 50 as well as the voltage across the base and the collector of the transistor 73 are arranged to maintain constant and thus the biasing conditions of other transistors do not vary. Therefore, the predetermined rotational speed can be selected in a wide range without changing the control characteristic of the control system.

What is claimed is:

1. A rotational speed control system for an electric motor comprising:
(a) a rotational speed detector for producing a DC voltage the magnitude of which varies in accordance with the rotational speed of the rotor of said electric motor;

(b) a PNM signal generator responsive to said rotational speed detector for producing a PNM signal comprising constant width pulses, the number of said pulses per a unit time varying in accordance with the magnitude of the DC voltage, said pulses being generated independently of rotational position of a shaft of said motor; and (c) a power switching circuit responsive to said PNM signal generator and to said electric motor for switching the feed of electric power to said electric motor in accordance with the PNM signal, said power being removed from said motor during said constant width pulses.

2. A rotational speed control system as claimed in claim 1, wherein said PNM signal generator comprises a pulse generator having a first capacitor, charging means and discharging means for said first capacitor, said pulse generator generating a train of pulses by charging and discharging said first capacitor, and a comparing-inverting circuit for logically inverting the output signal of said pulse generator to define an edge of each pulse by rapidly discharging said first capacitor when a difference between a voltage across the first capacitor and said DC voltage equals a predetermined value.

3. A rotational speed control system as claimed in claim 1, wherein said rotational speed detector comprises a sampling circuit for sampling the counter electromotive force produced by the electric motor in response to the PNM signal, said sampling circuit producing an output signal indicating the magnitude of the counter electromotive force; and a smoothing circuit responsive to said sampling circuit for smoothing the output signal of said sampling circuit.

4. A rotational speed control system as claimed in claim 3, wherein said smoothing circuit includes a second capacitor and said sampling circuit comprises first switching means interposed between said motor and said second capacitor included in said smoothing circuit, and second switching means connected in parallel via a resistor to said second capacitor.

5. A rotational speed control system as claimed in claim 3, wherein said rotational speed detector comprises a voltage divider including a variable resistor connected across said electric motor, a movable contact of said variable resistor being connected to the input of said sampling circuit, the variable resistor being operative for setting a predetermined rotational speed of the rotor of said electric motor.

6. A rotational speed control system as claimed in claim 3 wherein said sampling circuit comprises a comparator having two input terminals, one of the input terminals being fed with a reference signal and the other input terminal being fed with said DC voltage, and third switching means interposed between said comparator and a feeding bus line.

* * * * *